United States Patent [19]
Mizuno

[11] Patent Number: 5,924,611
[45] Date of Patent: *Jul. 20, 1999

[54] TRUNK NET STRUCTURE FOR VEHICLE

[75] Inventor: Kazuyuki Mizuno, Isehara, Japan

[73] Assignee: Nissan Motor Co., Ltd., Kanagawa, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/606,251

[22] Filed: Feb. 23, 1996

[30] Foreign Application Priority Data

Mar. 6, 1995 [JP] Japan .................................... 7-045197

[51] Int. Cl.$^6$ .................................................. B60R 7/02
[52] U.S. Cl. .................... 224/42.4; 224/543; 224/557; 224/563; 296/37.5; 410/116; 410/118
[58] Field of Search .................................. 224/42.4, 563, 224/557, 539, 542, 543, 42.32, 568; 296/214, 97.9, 37.6, 37.5, 37.1; 410/116, 101, 117, 118, 97; 403/2; 248/499

[56] References Cited

U.S. PATENT DOCUMENTS

| | | |
|---|---|---|
| 3,170,611 | 2/1965 | Gullen ..................................... 224/318 |
| 4,267,871 | 5/1981 | Weidler ...................................... 403/2 |
| 4,964,771 | 10/1990 | Callihan ................................... 410/118 |
| 5,121,958 | 6/1992 | Gorden et al. .......................... 296/37.1 |
| 5,207,260 | 5/1993 | Commesso .............................. 410/118 |
| 5,340,004 | 8/1994 | Moore . |
| 5,370,484 | 12/1994 | Morikawa et al. ....................... 411/48 |
| 5,452,973 | 9/1995 | Arvin ...................................... 410/118 |

FOREIGN PATENT DOCUMENTS

| | | |
|---|---|---|
| 0555125 | 8/1993 | European Pat. Off. .............. 224/42.4 |
| 58-158736 | 10/1983 | Japan . |
| 1-79045 | 12/1989 | Japan . |
| 4002534 | 1/1992 | Japan ...................................... 410/97 |

*Primary Examiner*—Linda J. Sholl
*Attorney, Agent, or Firm*—McDermott, Will & Emery

[57] ABSTRACT

A trunk net for a vehicle has a first net area for holding luggage on a floor, and a second net area for holding the luggage between the net and an upright panel, and anchor members for holding the trunk net in a luggage compartment are distributed in the compartment so as to set the trunk net in various manners. At least one of the anchor members has a net holder for holding the net and a base which supports the net holder on a vehicle body panel and which further serves as a fastener for fastening an interior trim member to the vehicle body panel. This trunk net structure makes it possible to set the net in various manners, and facilitates the fixing of the interior trim members to the vehicle body panels.

26 Claims, 13 Drawing Sheets

5,924,611

TRUNK NET STRUCTURE FOR VEHICLE

BACKGROUND OF THE INVENTION

The present invention relates to a trunk net structure, or a vehicle body structure including a trunk net structure, for storing and holding luggage in a compartment of a vehicle.

Japanese Utility Model Provisional Publication No. 58-158736 shows a conventional trunk net structure in which hooks of a trunk net are caught by holders attached to the floor panel through brackets.

In this net structure, however, it is not possible to set the net member in various ways, and to sort pieces of luggage into two or more groups separately stored by the net member. Furthermore, an excessive load, when applied from the net member to the holders, tends to deform the floor panel or break a screw fastener for fastening the bracket to the floor panel.

SUMMARY OF THE INVENTION

It is therefore an object of the present invention to provide a net structure, or a vehicle body structure comprising a net structure, which makes it possible to set the net member in a variety of manners.

It is another object of the present invention to provide a net structure, or a vehicle body structure comprising a net structure, which can prevent a vehicle body panel from being deformed by an excessive load applied through the net member.

According to one embodiment of the present invention, a trunk net structure for a vehicle, comprises: a net member comprising a first net area for holding luggage on a floor panel of a trunk compartment of a vehicle, and a second net area for holding the luggage between said second net area and an upright panel of the trunk compartment, such as a trunk room rear panel; and a net holding means, such as anchor members, for holding said first and second net areas of said net member and for serving also as a trim fixing means for fixing an interior trim member in the trunk compartment.

The net member can be set so as to provide two storage pockets, one formed between the first net area and the floor and the other between the second net area and the upright wall, so that luggage items can be conveniently arranged in two separate groups. The net holding means of the embodiment combines the function of grasping the net member and the function of fastening a interior trim member to a vehicle body panel, so that other fasteners, such as clips, for fastening the trim member can be eliminated.

DETAILED DESCRIPTION OF THE INVENTION

FIGS. 1~14 show a trunk (or luggage) room structure having a net structure according to one embodiment of the present invention.

Figure 2:
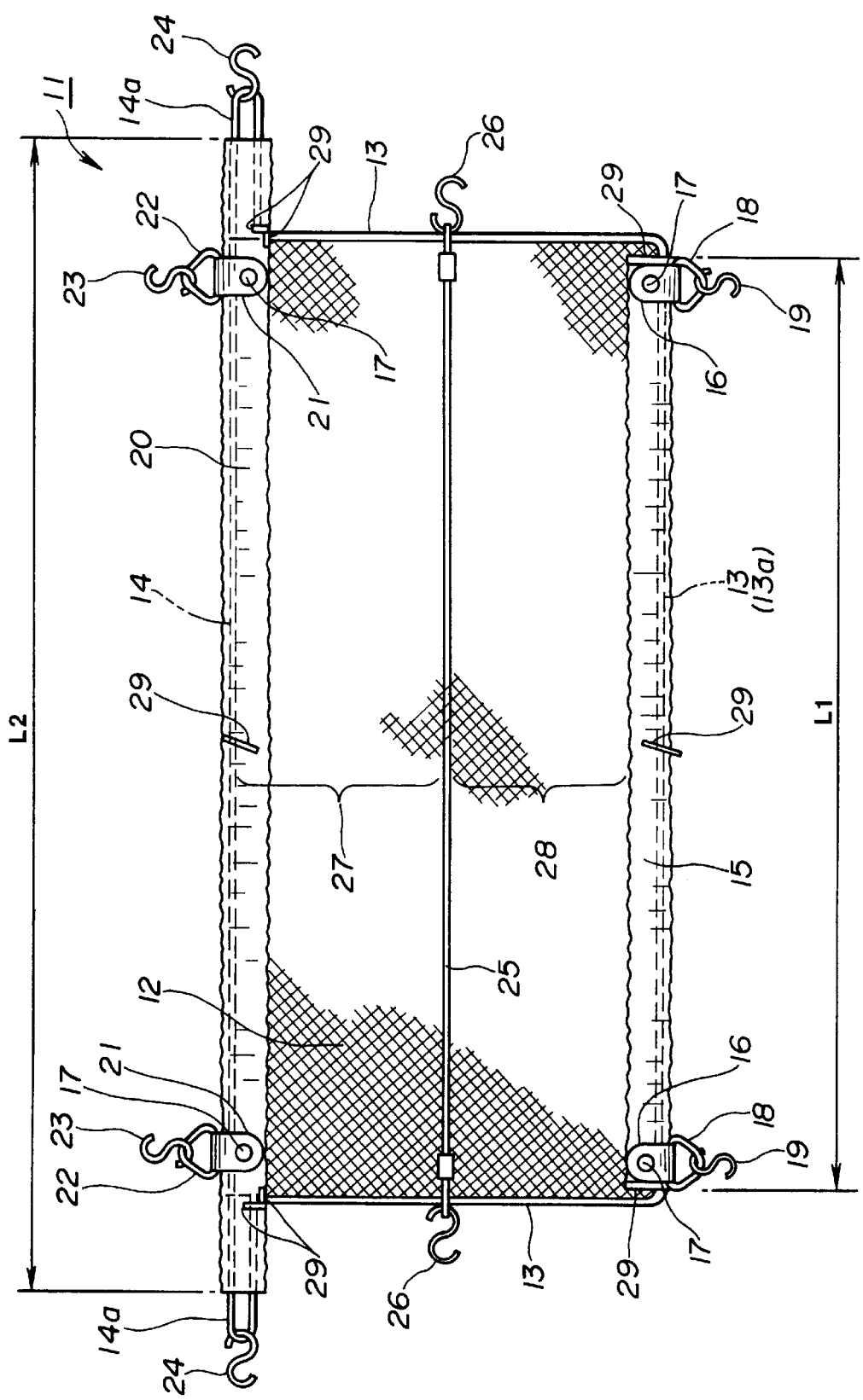
FIG. 2 is a plan view showing a trunk net member 11 according to the embodiment of the present invention.

A net member 11 of this example is a rectangular net 12 of russell knitting, as shown in FIG. 2. The rectangular net 12 is designed to hold one or more pieces of luggage in the vehicle. In the expanded state of FIG. 2, the net 12 is in the form of a rectangle having front and rear long sides and left and right short sides.

First and second elastic rubber cords 13 and 14 are attached to the luggage net 12 so as to frame the rectangular net 12. The first elastic cord 13 extends along the short right side, the long rear side and the short left side of the luggage net 12 in the form of a letter U. The first elastic cord 13 has a middle cord segment 13a extending along the long rear side of the rectangular luggage net 12, and left and right side segments extending along the left and right short sides of the luggage net 12, respectively. The second elastic cord 14 extends along the long front side of the luggage net 12. Each of the elastic cords 13 and 14 is inserted through meshes of the luggage net 12.

A first cloth tape 15 is folded and sewn along the rear side of the rectangular luggage net 12, like trimmings or bindings, so as to enclose the middle cord segment 13a of the first elastic cord 13. The rear side of the luggage net 12 and the middle cord segment 13a of the first elastic cord 13 are protected and reinforced between the folded halves of the first cloth tape 15.

Two first grip members (or clips) 16 are attached to the rear side of the luggage net 12, respectively at the left and right corners of the rectangular net 12. Each grip member 16 is U-shaped in the cross section, and has first and second arms between which the first cloth tape 15, the rear side of the luggage net 12 and the middle segment 13a of the first elastic cord 13 are confined and gripped. The first and second arms of each grip member 16 are joined together by rivets (or caulking) 17.

An S-shaped first hook 19 is connected with each of the grip members 16 through a ring 18 which, in this example, is a triangular ring. In the example shown in FIG. 2, the length L1 of the first cloth tape 15 is about 1000 mm.

A second cloth tape 20 is attached to the front side of the rectangular luggage net 12 and encloses the second elastic cord 14 in the same manner as the first cloth tape 15.

Two second grip members 21 are attached to the front side of the luggage net 12, respectively, near the left and right sides of the rectangular net 12. Each of the second grip members 21 grips the second cloth tape 20 with two arms joined together by stalking 17.

An S-shaped second hook 23 is linked with each of the second grip members 21 through a ring 22, like the first hooks 19. The rings 22 in this example are triangular rings.

In the illustrated example, the length L2 of the second cloth tape 20 is about 1240 mm. The left and right ends of the second cloth tape 20 project in opposite directions beyond the luggage net 12.

The second elastic cord 14 has left and right end portions 14a projecting in opposite directions from the left and right ends of the second cloth tape 20, respectively. Each of the left and right end portions 14a of the second elastic cord 14 is looped or U-shaped. In this example, each end portion 14a of the second elastic cord 14 extends so as to make a U-turn.

An S-shaped third hook 24 is connected with each of the left and right end portions 14a of the second elastic cord 20.

A third elastic rubber cord 25 laterally extends about the middle between the front and rear sides of the rectangular luggage net 12 from the middle of the left side to the middle of the right side of the net 12. The third elastic cord 25 is also inserted through meshes of the luggage net 12. The third elastic cord 25 divides the luggage net 12 into a front net area (or second net area) 27 between the front side of the net 12 and the third elastic cord 25, and a rear net area (or first net area) 28 between the third elastic cord 15 and the rear side of the net 12.

An S-shaped fourth hook 26 is connected with each of the left and right ends of the third elastic cord 25.

In the first and second cloth tapes 15 and 20, there are provided a plurality of rubber sewn portions 29. Each of the cloth tapes 15 and 20 shrinks like bellows when the corresponding elastic cord 13 or 14 is in the contracted state.

Figure 1:
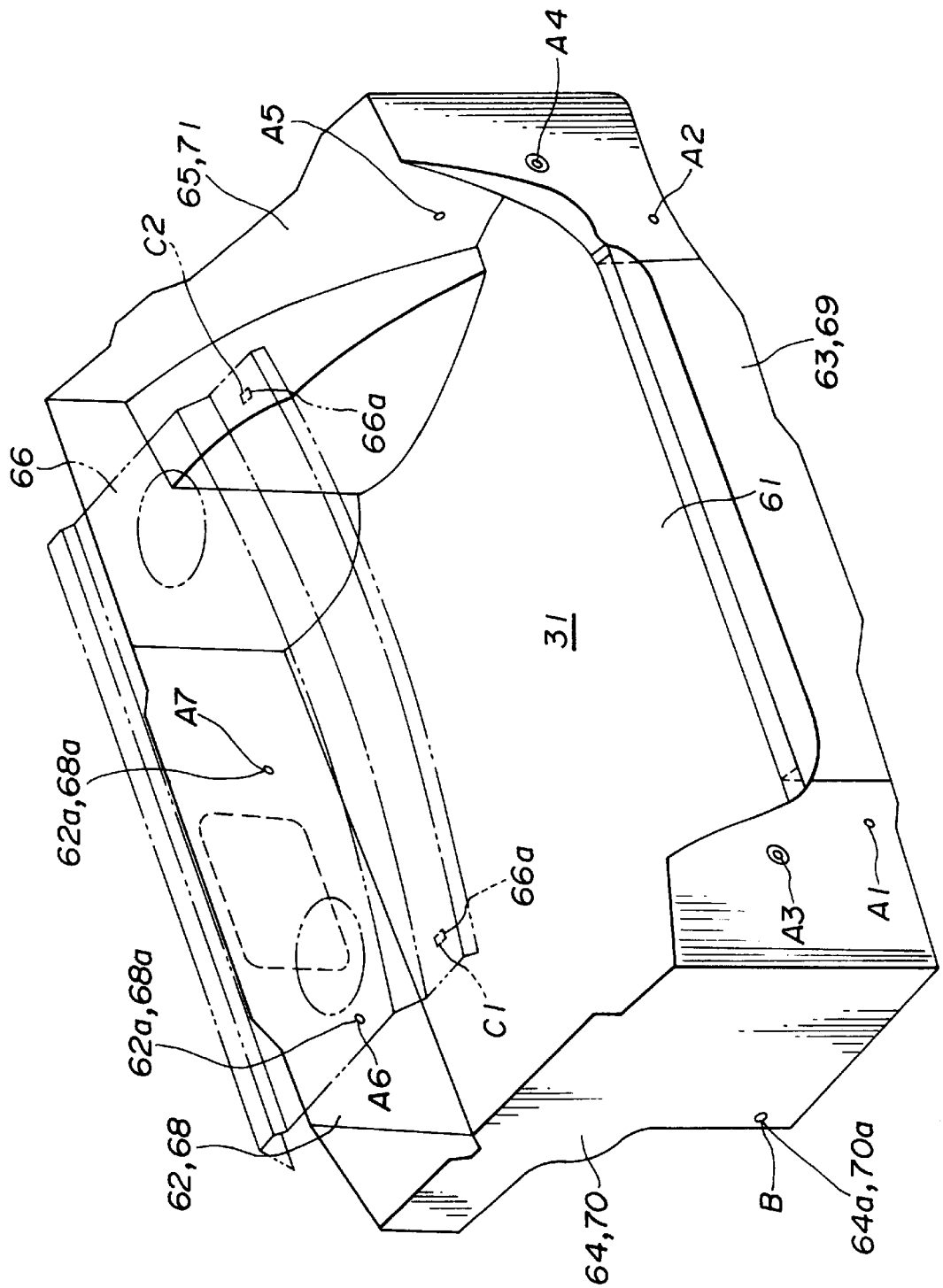
FIG. 1 is a schematic perspective view showing a trunk (or luggage) compartment 31 of a vehicle according to one embodiment of the present invention.

A trunk (or luggage) compartment 31 in a vehicle body is schematically shown in FIG. 1. The trunk room 31 is defined by a trunk (or luggage) room structure of the vehicle body. The trunk room structure of this example has a floor panel 61 defining the floor of the trunk compartment 31, a trunk room front upright partition panel 62, a trunk room rear upright panel 63, left and right trunk room side upright panels 64 and 65, and a parcel panel 66. The trunk compartment 31 is defined by these panels 61~66.

A trunk room front trim member 68, a trunk room rear trim member 69, left and right side trim members 70 and 71 are attached, respectively, to the front panel 62, the rear panel 63, and the left and right side panels 64 and 65. In FIG. 1, the panel and the trim member on each side are indicated at the same position for convenience sake.

A net holding means for setting the net member 11 in the trunk room compartment 31 is fixed in the trunk room compartment 31. The net holding means in this illustrated example includes seven first anchor members 32, one second anchor members 33 and two third anchor members 34 which are provided, respectively, at ten predetermined anchor points A1~A7, B, C1 and C2 in the trunk compartment 31 as shown in FIG. 1. The seven first anchor members 32 are located, respectively, at the anchor points A1~A7. The second anchor member 33 is at the anchor point B, and the two third anchor members 34 are, respectively, at the anchor points C1 and C2.

FIGS. 3A~3C and 4 show one of the first anchor members 32. The first anchor member 32 shown in FIGS. 3A~3C and 4 is attached at the anchor point A6 or A7. The anchor member 32 shown in these figures has a disk-shaped grommet 36, a semicircular holder 37 rotatably mounted on the grommet 36, and a pin 38 inserted into a center hole of the grommet 36.

The grommet 36 shown in FIGS. 3A~3C and 4 has a projecting central insert portion 36b projecting from a disk-shaped head of the grommet 36. The projecting insert portion 36b is inserted in an attachment hole formed in a vehicle body panel member. In the illustrated example, the vehicle body panel member consists of the front panel 62 and the front trim member 68, and the attachment hole is a single continuous hole consisting of a hole 62a formed in the front panel 62 and a hole 68a formed in the front trim member 68. The projecting center insert portion 36b of the grommet 36 is tubular (approximately shaped like a hollow cylinder) and formed with a plurality of slits 36c extending axially from the end of the insert portion 36b. With the slits 36c, the tubular insert portion 36b can expand so as to increase the outside diameter and contract so as to decrease the outside diameter.

Figure 3A:
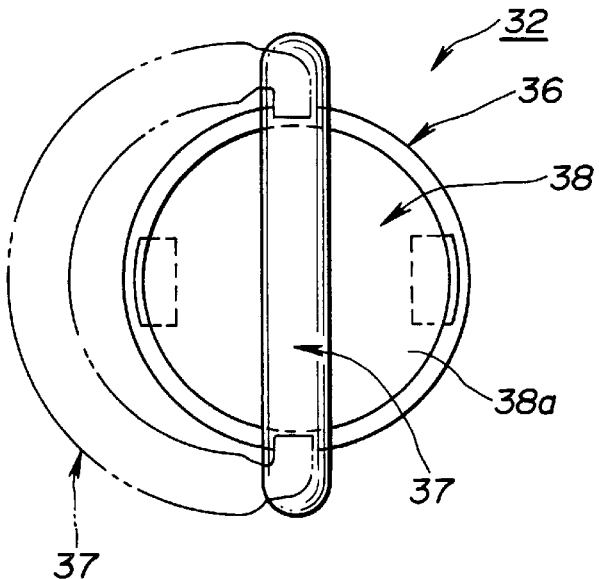
FIG. 3A is a plan view showing one of first anchor members 32 according to the embodiment of the invention.
Figure 3B:
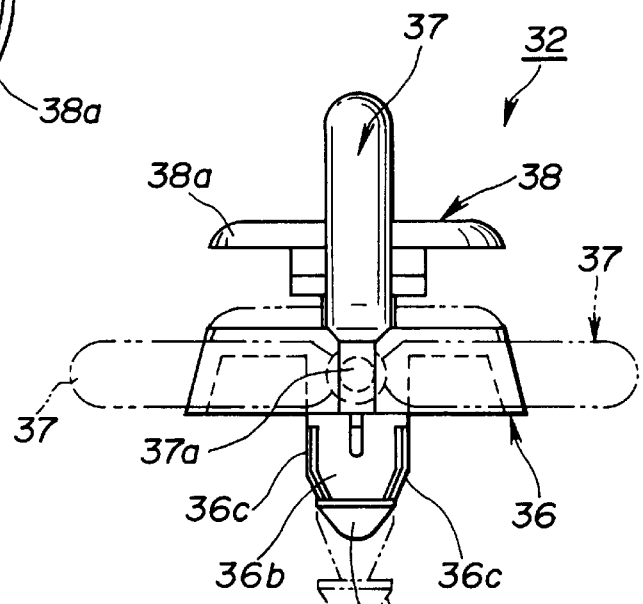
FIG. 3B is a front elevation of the first anchor member 32 shown in FIG. 3A.
Figure 3C:
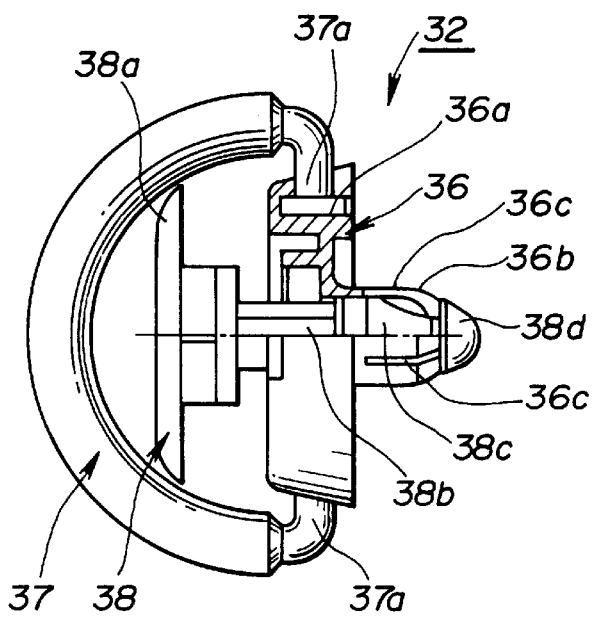
FIG. 3C is a right side view of the first anchor member 32 of FIG. 3A.
Figure 4:
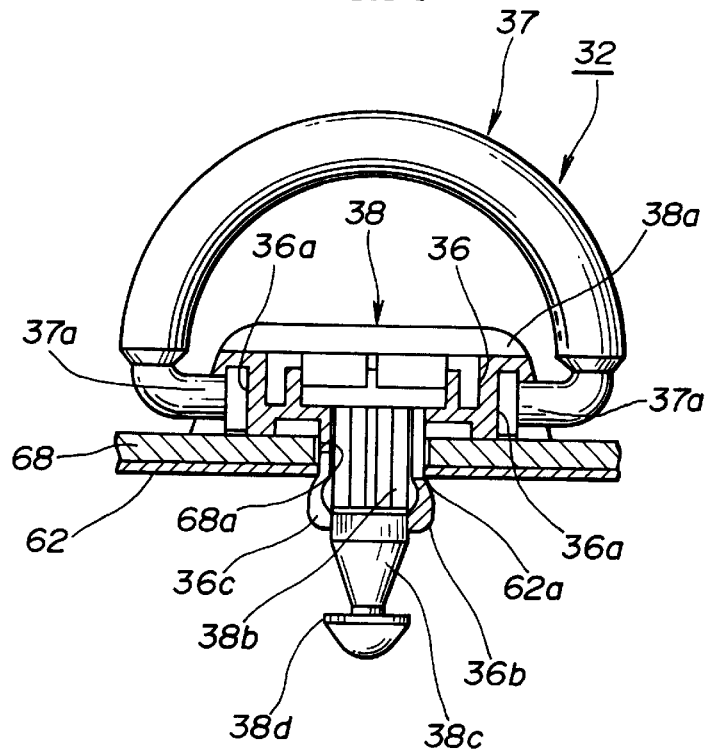
FIG. 4 is a sectional view showing the first anchor member 32 of FIG. 3A, attached to a vehicle body panel 62 and an interior trim 68.

The pin 38 shown in FIGS. 3A~3C and 4 has a head-38a and a projecting insert portion (or shank) 38b inserted into the tubular projecting center portion 36b of the grommet 36. The insert portion 38b of the pin 38 has an expanding portion 38c and a stopper end 38d. In this example, the expanding portion 38c is conical and tapered toward the end of the end 38d of the insert portion 38b. When the insert portion 39b of the pin 38 is inserted into the tubular insert portion 36b of the grommet 36 from the top of the head of the grommet 36 as shown in FIG. 4, the conical expanding portion 38c of the insert portion 38b of the pin 38 expands the tubular projecting insert portion 36b of the grommet 36. As a result, the tubular projecting insert portion 36b of the grommet 36 is fit in the attachment hole 62a and 68a of the vehicle body panel member 62 and 68 in such a manner that the tubular projecting insert portion 36b of the grommet 36 cannot be removed from the attachment hole 62a and 68a. In this state, the panel 62 and the trim member 68 are clamped between the head of the grommet 36 and the expanded end of the insert portion 36b of the grommet 36, as shown in FIG. 4.

The stopper end 38d of the pin 38 is enlarged in cross sectional size or diameter. The stopper end 38d of the pin 38 of this example has a round tip and an annular stopper surface facing toward the head 38a of the pin 38. When the pin 38 is a pulled state as shown in FIG. 3C, the annular stopper surface of stopper end 38d abuts against the end of the projecting insert portion 36b of the grommet 36, and thereby prevents the pin 38 from being extracted from the grommet 36. In a fully inserted state of the pin 38 as shown by two dot chain lines in FIG. 3B and in FIG. 4, the end of the insert portion 36b of the grommet 36 is expanded by the conical expanding portion 38c of the pin 38. In this state, a neck of the pin 38 formed between the head 38a and the insert portion 38b is fit in a recess formed in the head of the grommet 36. This recess is open in the top of the head of the grommet 36, and the center hole of the grommet 36 passes through the insert portion 36b of the grommet 36 and opens into the recess.

The holder 37 shown in FIGS. 3A~3C and 4 has a semicircular arc portion which is curved like a semicircular arc of a circle, and first and second end portions (or fuse portions) 37a which are bent inward at both ends of the arc portion and which are projected toward each other so as to extend along the chord of the arc from both ends of the chord. The first and second end portions 37a of the holder 37 are rotatably fit in first and second supporting (or bearing) portions 36a of the grommet 36a, respectively. The first and second supporting portions 36a are formed at both ends of a diameter of the circular head of the grommet 36. Each of the first and second supporting portions 36a has a hole opening in the circumferential surface of the head of the grommet 36, and receiving one of the end portions 37a of the holder 37. Each of the first and second end portions 37a of the holder 37 is reduced in sectional size as compared with the arc portion so that each end portion 37a can be broken by an external force before the trunk front panel 62 is deformed. In this example, the diameter of the first and second end portions 37a is smaller than the diameter of the arc portion of the holder 37, and accordingly each end portion 37a of the holder 37 can be broken by a force of a magnitude smaller than a force required to deform the vehicle body panel.

The second anchor member 33 has a disk-shaped grommet 40 and a cap 41 rotatably mounted on the top side of the grommet 40, as shown in FIGS. 5A~5D and 6. The second anchor member 33 further includes a semicircular holder 42 which is rotatably supported with the cooperation of grommet 40a and the cap 41, and a tap screw (or tap bolt) 43 for fastening the second anchor member 33 to the vehicle body panel which, in this example, is the trunk left side panel 64.

The grommet 40 shown in FIGS. 5A~5D and 6 has a center hole 40a and first and second inward projections 40b projecting from the inside surface of the center hole 40a. The grommet 40 further has first and second supporting (or bearing) portions 40c formed in an outside circumferential surface at both ends of a diameter of the circular grommet 40.

The holder 42 shown in FIGS. 5A~5D and 6 has a semicircular arc portion, and first and second end portions (or fuse portions) 42a which are bent inward at both ends of the arc portion and which are projected toward each other. The first and second end portions 42a of the holder 42 are rotatably fit in the first and second supporting portions 40c of the grommet 40, respectively. Each of the first and second end portions 42a of the holder 42 is reduced in sectional size or diameter as compared with the arc portion so that each end portion 42a can be broken by an external force before the vehicle body panel is deformed, like the holders 37 of the first anchor members 32.

Figure 5A:
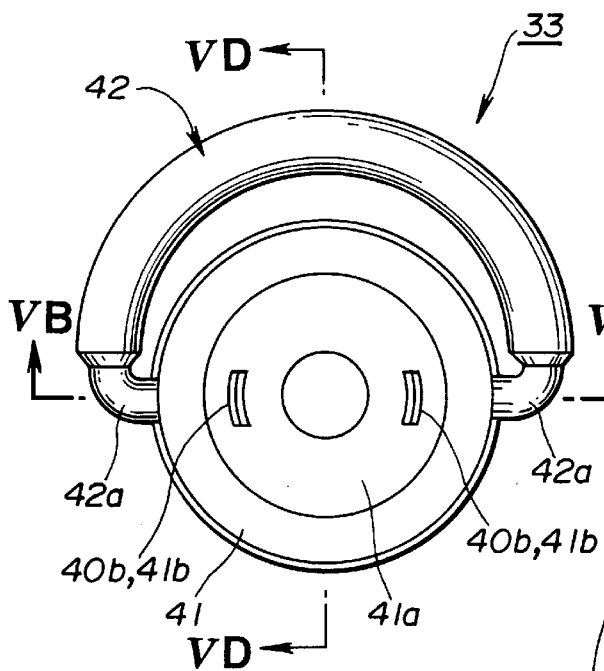
FIG. 5A is a plan view showing a second anchor member 33 according to the embodiment of the invention.
Figure 5B:
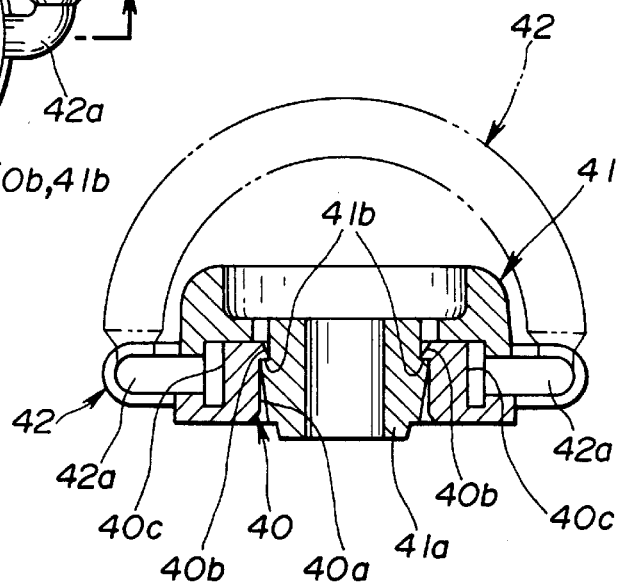
FIG. 5B is a sectional view taken across a line VB—VB of FIG. 5A.
Figure 5C:
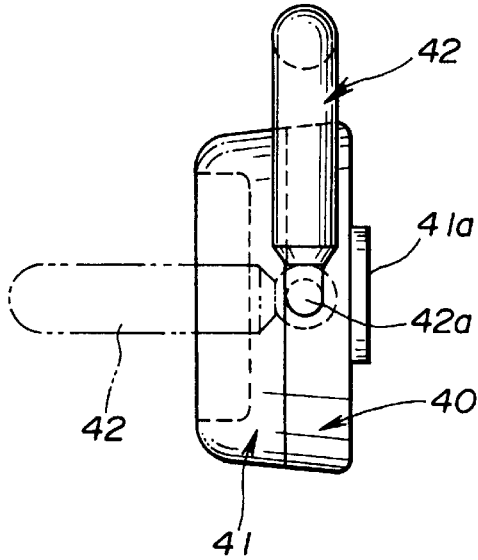
FIG. 5C is a right side view of the second anchor member 33 shown in FIG. 5A.
Figure 5D:
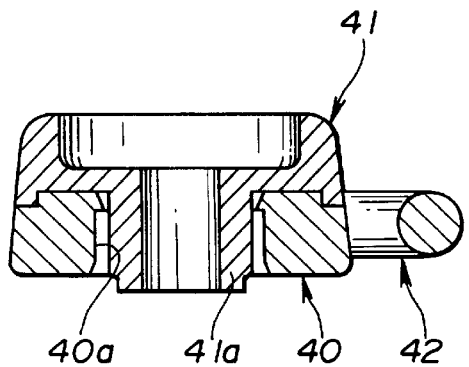
FIG. 5D is a sectional view taken across a line VD—VD of FIG. 5A.
Figure 7A:
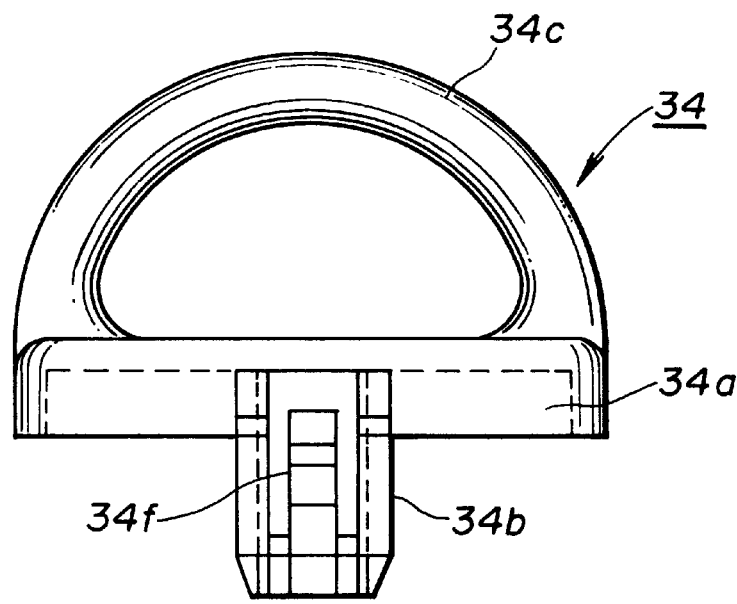
FIG. 7A is a front view of one of third anchor members 34 according to the embodiment of the present invention.
Figure 7B:
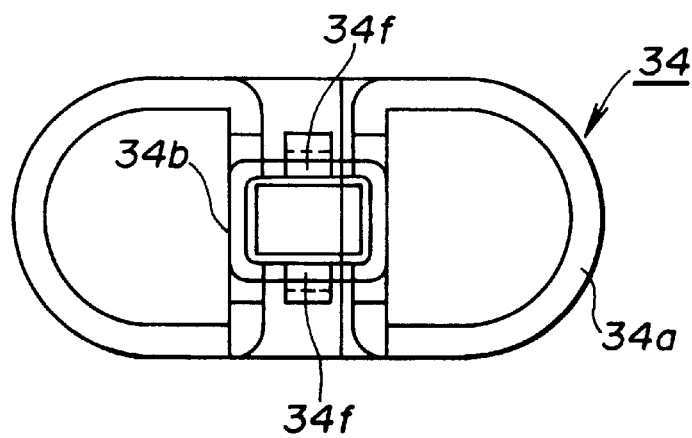
FIG. 7B is a bottom view of the third anchor member 34 shown in FIG. 7A.
Figure 7C:
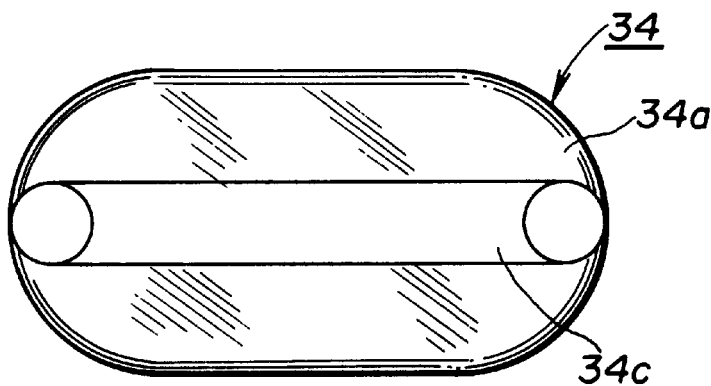
FIG. 7C is a plan view of the third anchor member 34 of FIG. 7A.

The cap 41 overlies the grommet 40 and thereby holds the holder 42. The cap 41 prevents the holder 42 from being extracted upward from the grommet 40. The cap 41 has a head and a center tubular insert portion 41a projecting from the head. The tubular insert portion 41a of the cap 41 is inserted in the center hole 40a of the grommet 40. The tubular insert portion 41a has first and second outward projections 41b projecting from the outside circumferential surface of the tubular portion 41a. The first and second outward projections 41b of the cap 41 abut axially against the first and second inward projections 40b of the grommet 40, respectively, so that the axial movement of the cap 41 is limited by the inward projections 40b of the grommet 40. As shown in FIG. 5B, the inward projections 40b of the grommet 40 are closer to the head of the cap 41 than the outward projections 41b of the cap 41 so that the cap 41 cannot move upward in FIG. 5B relative to the grommet 40.

Figure 6:
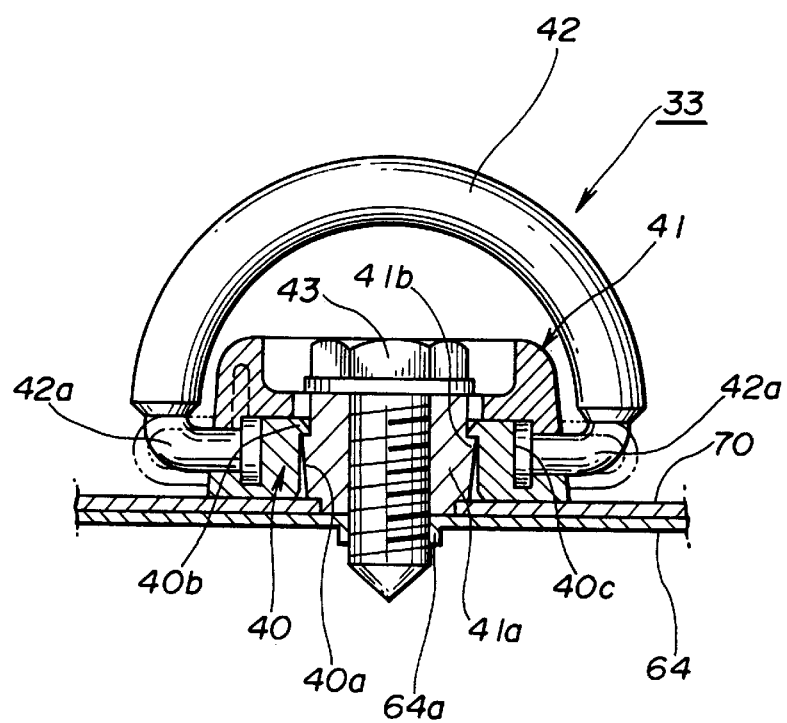
FIG. 6 is a sectional view showing the second anchor member 33 of FIG. 3A, attached to a vehicle body panel 64 and an interior trim 70.

The tap screw 43 is inserted in the tubular insert portion 41a of the cap 41 from the head of the cap 41, and screwed into a burring hole 64a formed in the trunk left side panel 64 through a through hole 70a of the trunk left side trim member 70, as shown in FIG. 6.

Figure 8:
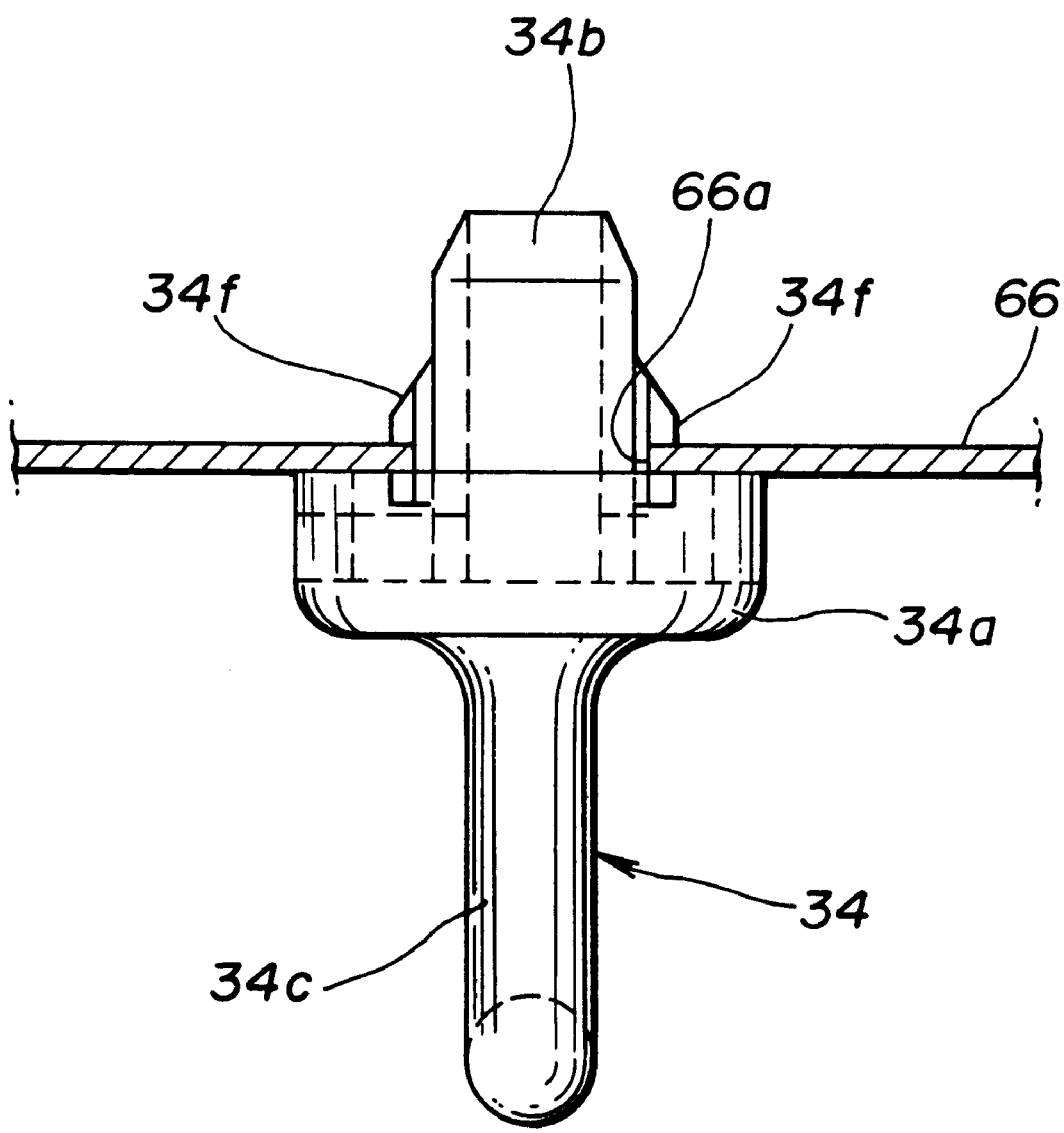
FIG. 8 is a sectional view of the third anchor member 34 of FIG. 7A, attached to a vehicle body panel 66.

One of the third anchor members 34 is shown in FIGS. 7A~7C and 8. The third anchor member 34 shown in these figures is integrally formed out of synthetic resin. The third anchor member 34 has an oblong base portion 34a, a tubular insert portion 34b projecting from the center of an inner side of the base portion 34a, and a semicircular holder portion 34c projecting from an outer side of the base portion 34a. The tubular insert portion 34b is approximately rectangular in cross section. The oblong base portion 34a of this example is elliptical, or shaped like an oblong circle. The insert portion 34b of the third anchor member 34 shown in these figures is inserted in a rectangular attachment hole 66a formed in the parcel panel 66 from the inside of the trunk compartment 31. The insert portion 34b of the third anchor member 34 has first and second stopper projections 34f which prevent the third anchor member 34 from being extracted by abutting on the surrounding wall of the attachment hole 66a of the parcel panel 66, as shown in FIG. 8.

The first anchor members 32, the second anchor member 33 and the third anchor members 34 are attached at the anchor points A1~A7, the anchor point B and the anchor points C1 and C2, respectively, in the following manner.

Each of the first anchor members 32 is attached first by inserting the insert portion 36b of each grommet 36 into the corresponding attachment hole, and then by pressing the pin 38 into the grommet 36. Therefore, the end of the insert portion 36b of the grommet 36 is expanded by the conical section 38c of the pin 38. As a result, the grommet 36 of each first anchor member 32 is fixed in the attachment hole of the vehicle body panel member, and the grommet 36 of each first anchor member 32 joins a trim member such as the trim member 68, 69 or 71 to a vehicle body panel such as the panel 62, 63 or 65. By serving as the means for fixing the trim members to the vehicle body panels, the first anchor members 32 according to the embodiment of the present invention can reduce the number of clip members for fixing the trim members to the vehicle body panels, and the number of clip points at which the trim members are fixed to the vehicle body panels.

When the head 38a of the pin 38 of each first anchor member 32 is pulled into the pulled position shown in FIG. 3C, the insert portion 36b of the grommet 36 is reduced in the cross sectional size, so that each first anchor member 32 can be readily removed from the corresponding attachment hole.

The second anchor member 33 is attached by screwing the tap screw 43 into the burring hole 64 of the trunk room left side panel 64. The second anchor member 33 also serves as a fastener for joining the left side trim member 70 to the left side panel 64.

The third anchor members 34 are attached by inserting the rectangular insert portion 34b into the rectangular attachment hole 62a of the parcel panel 66, and making the stopper projections 34f engaged with the surrounding wall of the parcel panel 66.

With these anchor members 32, 33 and 34, the net member 11 can be set in one of the following six types.

(1) Type 1

Figure 9:
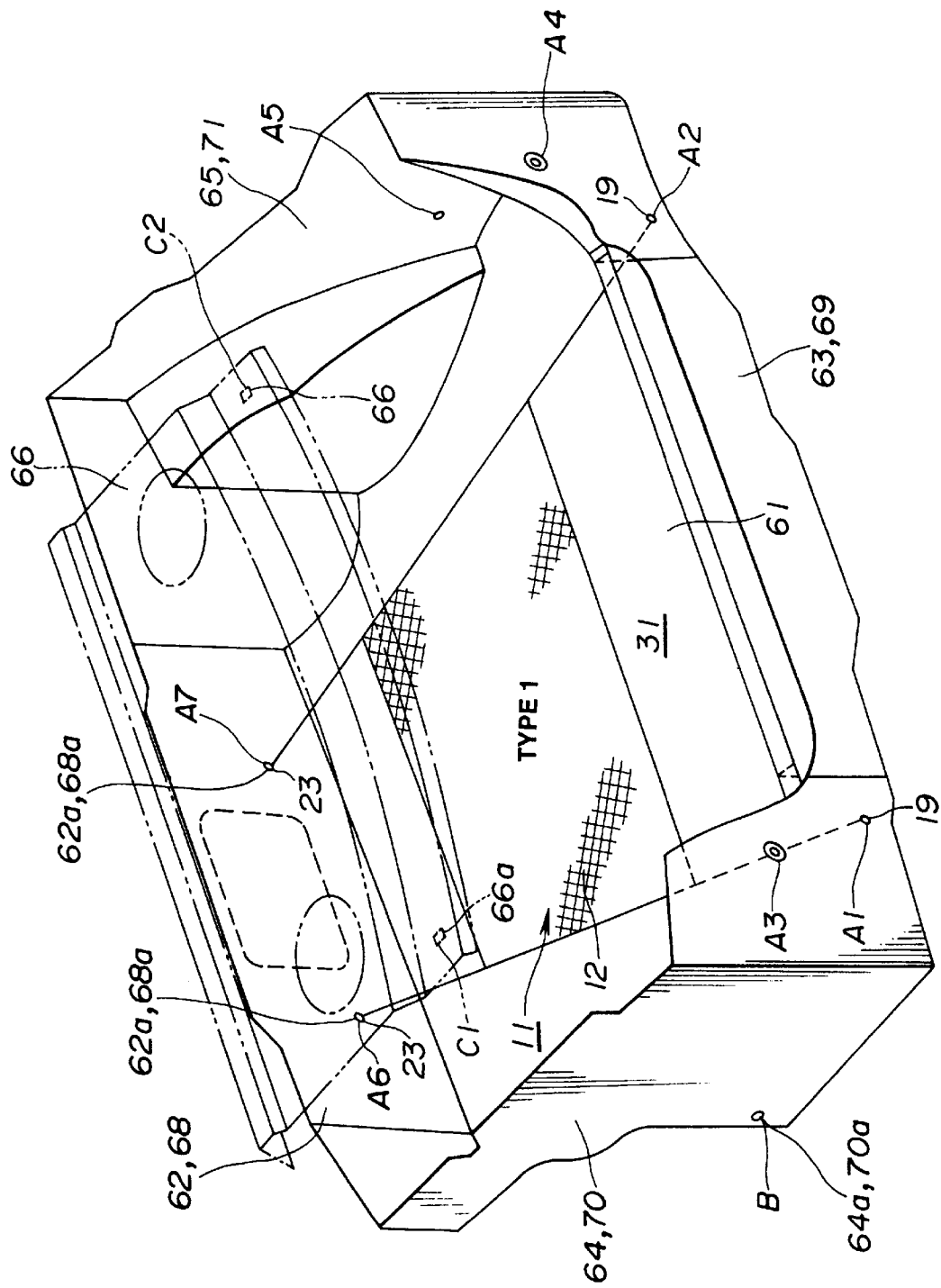
FIG. 9 is a schematic perspective view showing the net member 11 of FIG. 2 set in a manner of a type 1 in the trunk compartment 31.

As shown in FIG. 9, the net member 11 is fully spread over a floor area of the luggage compartment 31 to cover the luggage resting on the floor. In this state, the first left corner of the net member 11 is caught through the first left hook 19 by the first anchor member 32 at the lower left rear anchor point A1, the first right corner of the net member 11 is caught through the first right hook 19 by the first anchor member 32 at the lower right rear anchor point A2, the second left corner of the net member 11 is caught through the second left hook 23 by the first anchor member 32 at the left front anchor point A6, and the second right corner of the net member 11 is caught through the right second hook 23 by the first anchor member 32 at the right front anchor point A7.

(2) Type 2

Figure 10:
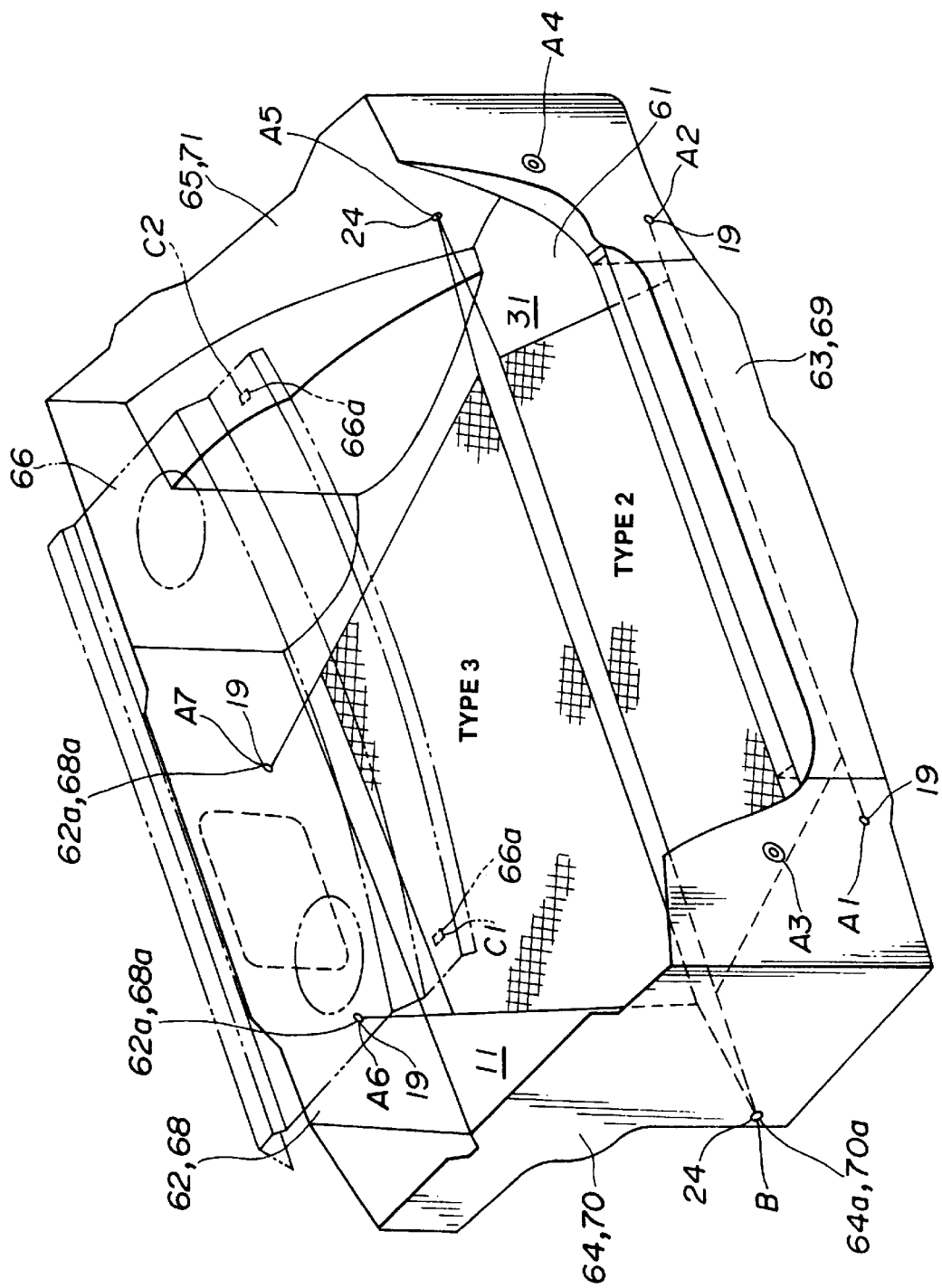
FIG. 10 is a schematic perspective view showing the net member 11 of FIG. 2 set in manners of types 2 and 3 in the trunk compartment 31.

As shown in FIG. 10, the net member 11 is spread over a rear half of the floor area to cover and hold the luggage on the rear half of the floor area. In this state, the holders 37 of the first anchor members 32 at the left and right lower rear anchor points A1 and A2 catch, respectively, the first hooks 19 of the left and right first corners of the net member 11; the holder 37 of the first anchor member 32 at the right intermediate anchor point A5 catches the third hook 24 of the extension of the right second corner of the net member 11; and the holder 42 of the second anchor member 33 at the left intermediate anchor point B catches the third hook 24 of the extension of the left second corner of the net member 11.

(3) Type 3

As shown in FIG. 10, the net member 11 is spread over a front half of the floor area to cover and hold the luggage on the front half of the floor area. In this state, the holder 37 of the first anchor member 32 at the right intermediate anchor point A5 catches the third hook 24 of the extension of the right second corner of the net member 11; the holder 42 of the second anchor member 33 at the left intermediate anchor point B catches the third hook 24 of the extension of the left second corner of the net member 11; and the holders 37 of the first anchor members 32 at the left and right front anchor points A6 and A7 catch, respectively, the first hooks 19 of the left and right first corners of the net member 11.

(4) Type 4

Figure 11:
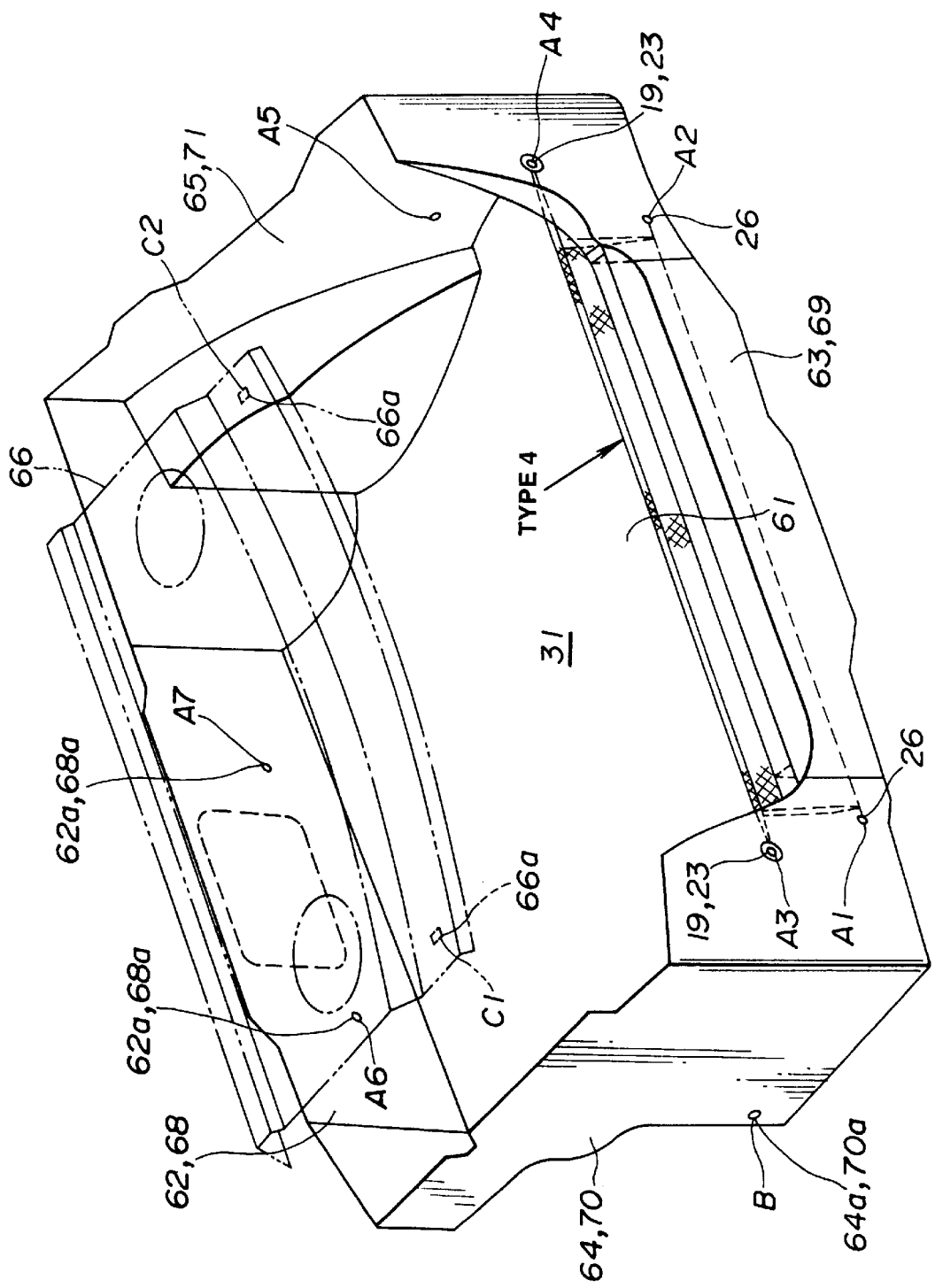
FIG. 11 is a schematic perspective view showing the net member 11 of FIG. 2 set in a manner of a type 4 in the trunk compartment 31.
Figure 13:
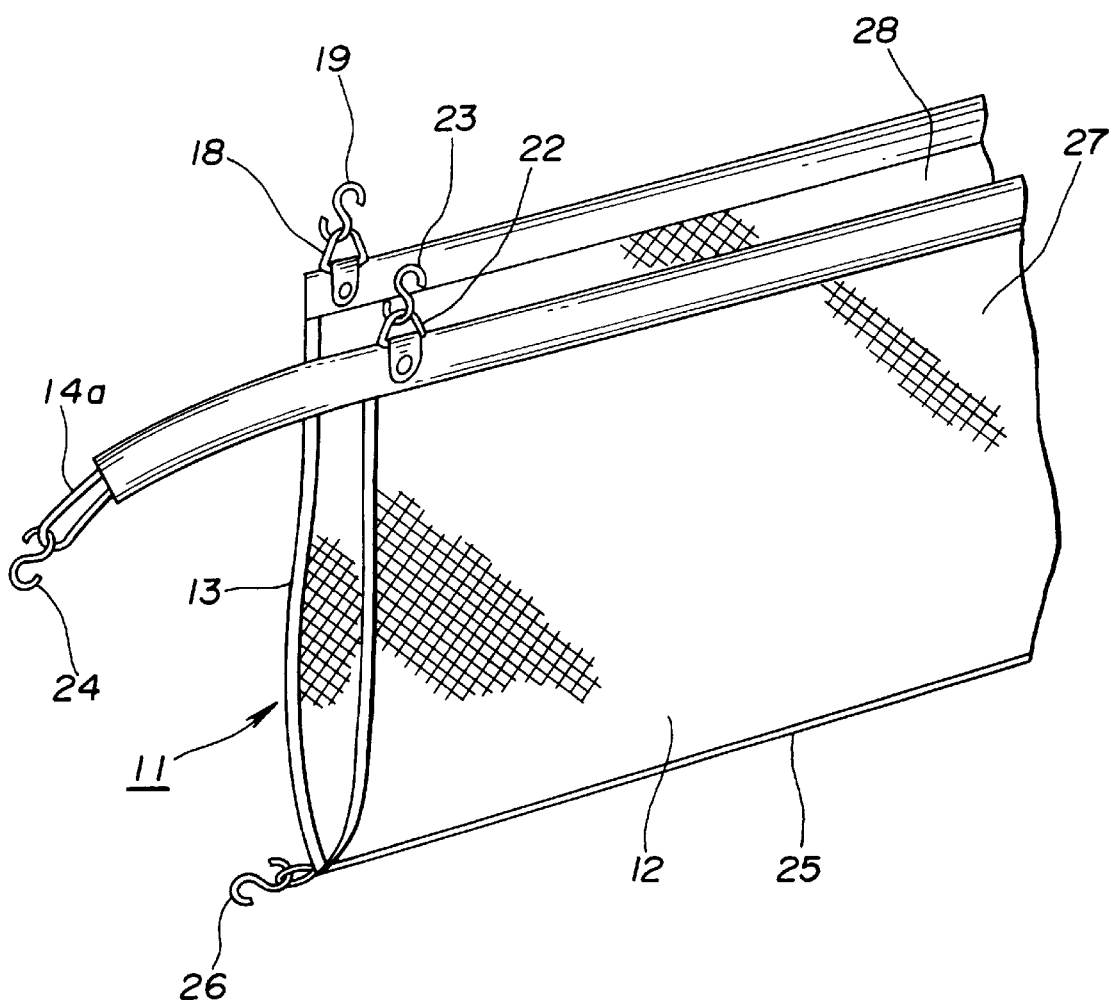
FIG. 13 is a perspective view showing the net member 11 of FIG. 2 in a folded state of the type 4.

As shown in FIGS. 11 and 13, the net member 11 is folded so that the first net area 28 extends over the second net area 27 so as to form a bag for containing the luggage. In this state, the holder 37 of the first anchor member 32 at the left upper rear anchor point A3 catches both of the first hook 19 of the first left corner of the net member 11 and the second hook 23 of the second left corner of the net member 11; the holder 37 of the first anchor member 32 at the right upper rear anchor point A4 catches both of the first, hook 19 of the first right corner of the net member 11 and the second hook 23 of the second right corner of the net member 11; and the holders 37 of the first anchor members 32 at the left and right lower rear anchor points A1 and A2 catch, respectively, the fourth hooks 26 of the left and right side portions of the net member 11.

(5) Type 5

Figure 12:
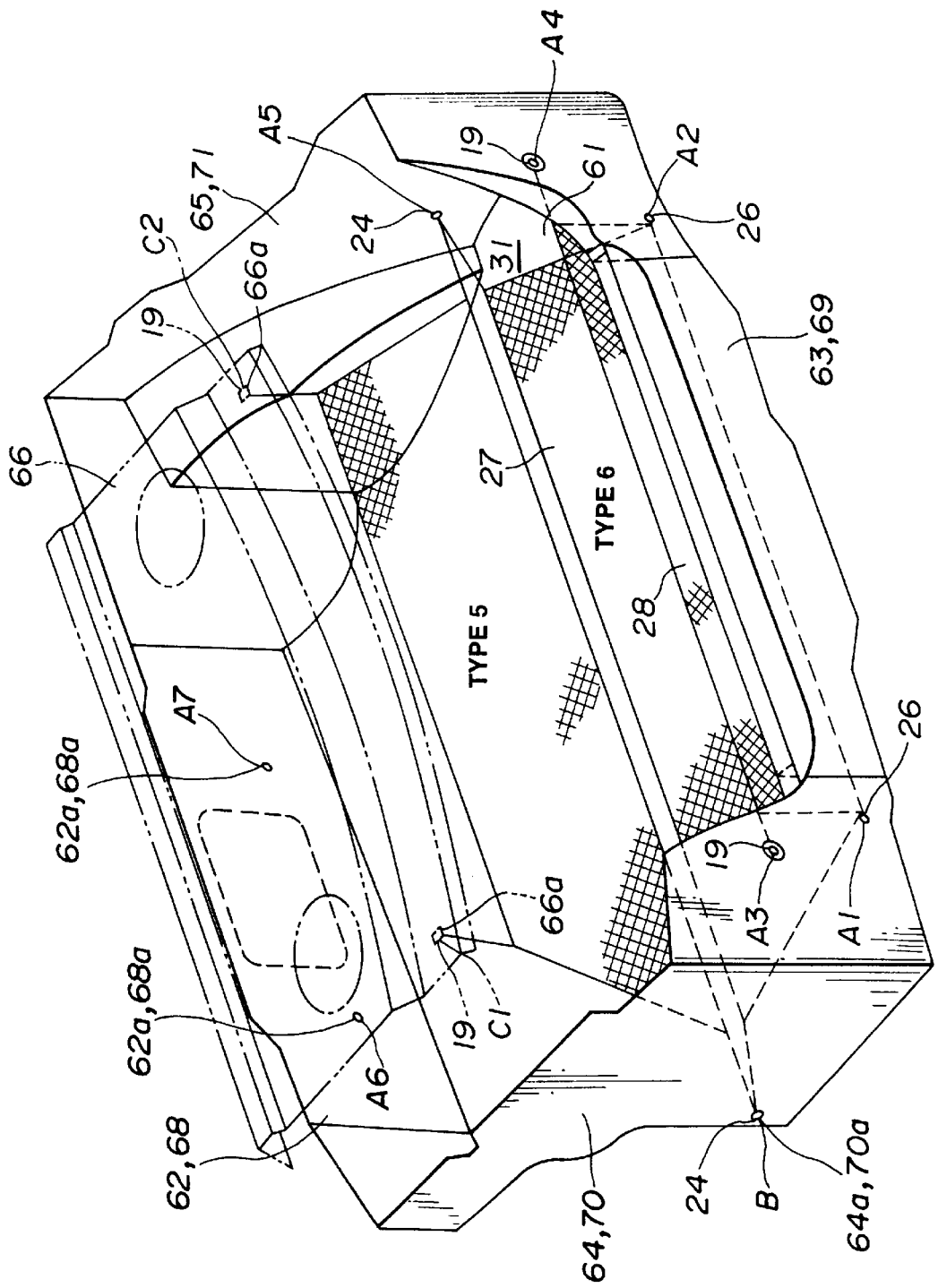
FIG. 12 is a schematic perspective view showing the net member 11 of FIG. 2 set in manners of types 5 and 6 in the trunk compartment 31.

As shown in FIG. 12, the net member 11 is set in an approximately vertical state so as to separate the luggage compartment into a front space and a rear space. In this state, the holders 34c of the third anchor members 34 at the overhead, higher anchor points C1 and C2 catch, respectively, the first hooks 19 of the left and right first corners of the net members 11; the holder 42 of the second anchor member 33 at the left intermediate anchor point B catches the third hook 24 of the extension of the left second corner of the net member 11; and the holder 37 of the first anchor member 32 at the right intermediate anchor point A5 catches the third hook 24 of the extension of the right second corner of the net member 11. Thus, the net member 11 is arranged like a partition, so that pieces of the luggage can be sorted desirably.

(6) Type 6

Figure 14A:
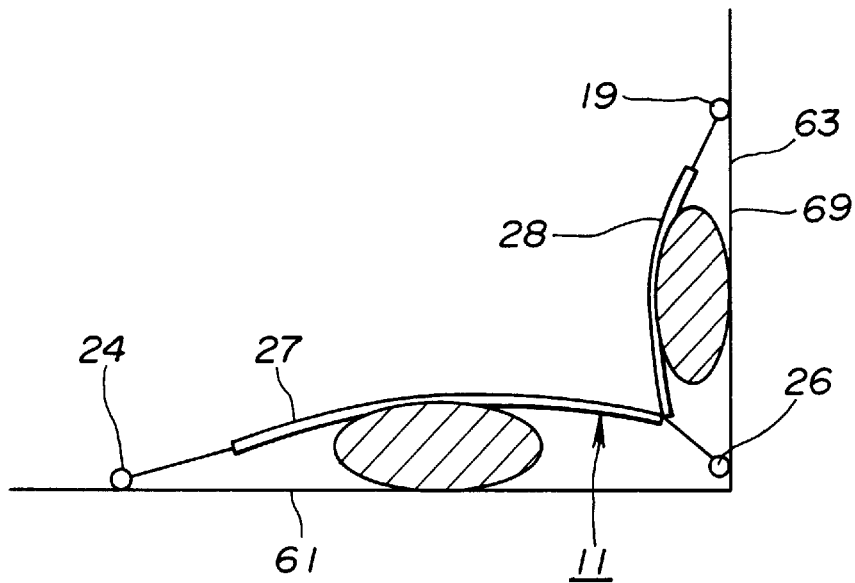
FIG. 14A is a schematic view showing the net member 11 of FIG. 2 set in an L-shaped state of the type 6.

As shown in FIGS. 12 and FIG. 14A, the net member 11 is set in a L-shaped state. In this state, the holder 37 of the first anchor member 32 at the right intermediate anchor point A5 catches the third hook 24 of the extension of the right second corner of the net member 11; the holder 42 of the second anchor member 33 at the left intermediate anchor point B catches the third hook 24 of the extension of the left second corner of the net member 11; the holders 37 of the first anchor members 32 at the left and right lower anchor points A1 and A2 catch, respectively, the fourth hooks 26 of the left and right side portions of the net member 11; and the holders 37 of the first anchor members 32 at the left and right upper anchor points A3 and A4 catch, respectively, the first hooks 19 of the left and right first corners of the net member 11.

In this L-shaped state, as shown in FIG. 14A, the vertically spreading first net area 28 of the net member 11 can hold one or more pieces of the luggage between the upright wall of the rear trim member 69 and the rear panel 63 and the first net area 28, and the horizontally spreading second net area 27 can hold one or more pieces of the luggage between the floor panel 61 and the second net area 27.

Figure 14B:
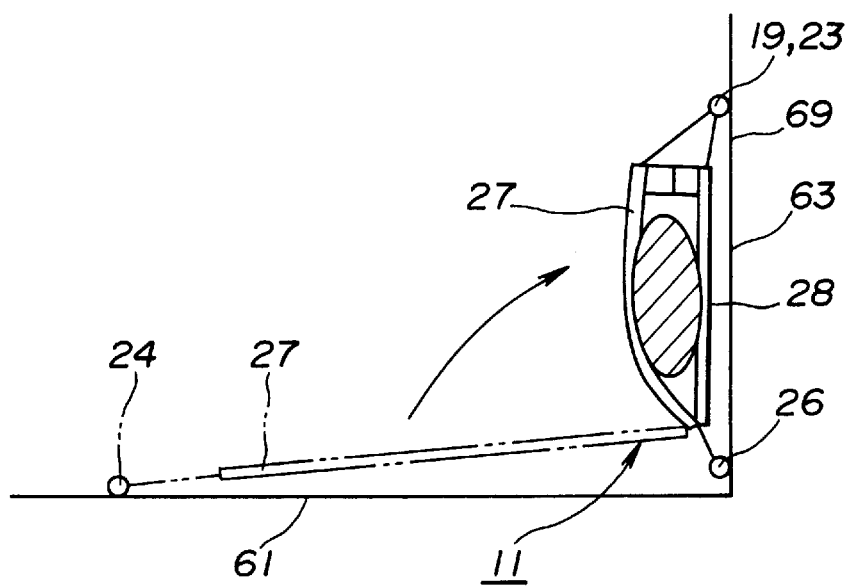
FIG. 14B is a schematic view showing the net member 11 of FIG. 2 set in the folded state of the type 4.

The net member 11 can be readily changed from the L-shaped state of the type 6 shown in FIG. 14A to the folded state of the type 4 shown in FIG. 14B by removing the third hooks 24 of the extensions of the left and right second corners of the net member 11, respectively, from the anchor members 33 and 32 at the left and right intermediate anchor points B and A5, and instead hanging the hooks 23 of the left and right second corners of the net member 11 on the holders 37 of the first anchor members 32 at the left and right upper anchor points A3 and A4.

The net structure according to the embodiment of the invention makes it possible to arrange various objects to be carried on the vehicle in a desired one of the six different types. Pieces of luggage can be stored and classified properly in the compartment 31. Furthermore, the net member 11 can be readily removed and set in a desired manner without any tool such as a screwdriver.

When an excessive load is applied through the net member 11 on the holder 37 or 42 of each of the first and second anchor members 32 and 33, the holder 37 or 42 breaks off at one of the reduced portions 37a or 42a. By so doing, the holder 37 or 42 protects the panel from being deformed by the excessive load, and prevents the anchor member 32 or 33 from being extracted by the excessive load, so that the trim member remains fixed to the panel. Each holder 37 or 42 can be readily replaced by removing the anchor member 32 or 33 and then engaging the reduced end portions 37a or 42a in the supporting portions 36a or 40c.

In the illustrated embodiment, the second and third anchor members 33 and 34 are employed for the anchor points B, C1 and C2. However, it is optional to employ the first anchor members 32 for all the anchor points including the points B, C1 and C2.

As explained above, the compartment structure according to the illustrated embodiment makes it possible to set the net member in various manners. Moreover, the compartment structure can eliminate, or reduce the number of, the separate fasteners for fastening the trim member to the vehicle body panel. Each of the first anchor members 32 can be removed and installed easily without any tool, by pulling and pushing the pin. The holders having the weakened portions can protect the vehicle body panel from being deformed by an external force.

According to the illustrated embodiment of the present invention, as explained above, a vehicle body structure comprises a compartment structure defining a compartment such as a luggage compartment (31), a net member (11) for holding one or more objects in the compartment, and a net holding means (32, 33, 34) for holding the net member in the compartment.

The compartment structure may comprise a panel structure composed of structural members such as the vehicle body panels (61~66), and an interior trimming means which, in the illustrated example, comprises the trim members (68~71).

The net member may comprise a net which is approximately in the form of a convex quadrilateral. In the illustrated example, the net is rectangular. The net member may comprise first and second half net areas. The first half net area comprises first and second quarter net areas, and the second half net area comprises third and fourth quarter net areas. The first, second, third and fourth quarter net areas comprise first, second, third and fourth remote net portions, respectively. The net member further comprises an intermediate net area which separates the first and second half net areas, and extends from a first side portion lying between the first and third quarter net areas to a second side portion lying between the second and fourth quarter areas. These net areas may be parts of a continuous single net. The four remote portions of the net member may be the four corners of the quadrilateral or rectangular net.

The net holding means comprises first and second upper anchor means such as the first anchor members 32 at the left and right upper rear anchor points A3 and A4, a first lower anchor member such as the first anchor member 32 at the left lower rear anchor point A1, a second lower anchor member such as the first anchor member 32 at the right lower rear anchor point A2, a first further anchor means, such as the second anchor member 33 at the left intermediate anchor point B or the first anchor member 32 at the left front anchor point A6, and a second further anchor means, such as the first anchor member 32 at the right intermediate anchor point A5 or the first anchor member 32 at the right front anchor point A7.

What is claimed is:

1. A trunk net structure for a vehicle, comprising:
   a trunk compartment comprising a floor panel and an upright wall;
   a net member comprising a first net area for holding luggage on said floor panel, and a second net area for holding the luggage between said second net area and an upright panel; and
   a first set of net holding anchor members for holding said first area of said net member on the floor panel, at least one of said first set of net holding anchor members being distributed on the floor panel;
   a second set of net holding anchor members for holding the second area of said net member on the upright wall, at least one of said second set of net holding anchor members being distributed on the upright wall, said second set of net holding anchor members fixing an interior trim member in position on the upright wall of the trunk compartment; and
   wherein said net member is held by said first and second sets of net holding anchor members in one of:
      an L-shaped state in which said first net area of said net member is held by said fist set of net holding anchor means for holding luggage between said first net area and floor panel, and in which said second net area is held by said second set of net holding anchor members for holding luggage between said second net area and said upright wall, and
      a folded state in which both of said first and second net areas are held by said second set of net holding anchor members for holding luggage between said first and second net areas and the upright wall.

2. A trunk net structure as claimed in claim 1, wherein, each anchor member of said first and second sets comprises:
   a grommet comprising an insert portion inserted in an attachment hole of a vehicle body panel;
   a holder, mounted on said grommet, for catching a hook of said net member; and
   a pin, inserted in said insert portion of said grommet, for expanding said insert portion of said grommet so that said insert portion of said grommet is secured in said attachment hole of said vehicle body panel, and for contracting said insert portion of said grommet so that said insert portion is released from said attachment hole.

3. A trunk net structure as claimed in claim 2, wherein, said holder of each anchor member of said first and second sets, comprises a reduced portion for being broken by an external force to protect the vehicle body panel from being deformed by the external force.

4. A trunk net structure as claimed in claim 2, wherein, said net member comprises:
   a first end hook attached to an end portion of said first net area;
   a second end hook attached to an end portion of said second net area, and
   an intermediate hook attached to an intermediate portion of said net member between said first and second net areas; and wherein:
      said net holding anchor members are distributed at upper and lower levels for setting said net member in a folded state in which said net member is folded so that each of said first and second net areas extends over the other so as to form a bag,
      said first and second end hooks of said net member are held at said upper level,
      said intermediate hook of said net member is held at said lower level; and
      said upper level is located above said lower level.

5. A trunk net structure as claimed in claim 2, wherein said grommet of each anchor member of said first and second sets comprises grommet head and grommet projection end for clamping the interior trim member and vehicle body panel between the grommet head and grommet projection end when said pin is inserted in said grommet.

6. A trunk net structure as claimed in claim 2, wherein said holder is in a form of a curved rod comprising an arc portion and first and second end portions which are bent inward toward each other at both ends of said arc portion, which are fit rotatably in diagonally opposite supporting portions formed in the grommet head of the grommet, and the first and second end portions of the holder are smaller in cross sectional size than said semicircular portion.

7. A trunk net structure as claimed in claim 1, wherein said anchor members are fixed at first and second upper anchor points on said upright panel, first and second lower anchor points located, respectively, below said first and second upper anchor points, and first and second further anchor points spaced, respectively, from said first and second lower anchor points in a direction away from said upright panel.

8. A trunk net structure as claimed in claim 1, wherein each of said anchor members comprises a net holding portion for holding said net member, and a base portion for fastening said interior trim member to a vehicle body panel structure defining said trunk compartment, and for supporting said net holding portion.

9. A trunk net structure as claimed in claim 8, wherein said trunk compartment is defined by said floor panel, said upright panel, an opposite panel standing upright and confronting said upright panel, and left and right side panels standing upright and confront each other between said upright panel and opposite panel, and said base portion of each anchor member comprises head and projection end for clamping said interior trim member and one of said upright, opposite and side panels between said head and end.

10. A trunk net structure as claimed in claim 1, wherein said first set and second set of net holding anchor members are each rigidly connected to a structural panel which forms a part of the trunk compartment.

11. A trunk net structure as claimed in claim 10, wherein the structural panel is essentially flat and free of recesses, and wherein each of said said first set and said second set of net holding members are arranged to have at least a portion which projects up above the surface of the structural panel.

12. A vehicle body structure comprising:
a compartment structure for defining a compartment in a vehicle body, said compartment comprising a floor and an upright wall comprising a first upright inside wall surface;
a net member for holding luggage in said compartment, said net member comprising a first half net area comprising a first quarter net area comprising a first remote portion, and a second quarter net area comprising a second remote portion, a second half net area comprising a third quarter net area comprising a third remote portion and a fourth quarter net area comprising a fourth remote portion, and an intermediate net area which separates said first and second half net areas, and extends from a first side portion lying between said first and third quarter net areas to a second side portion lying between said second and fourth quarter areas; and
a net holding means for holding said net member in one of set states comprising a folded state and an L-shaped state, said net holding means being attached to said compartment structure inside said compartment, said net holding means comprising first and second upper anchor means attached on said upright wall of said compartment structure, a first lower anchor member located below said first upper anchor means, a second lower anchor member located below said second upper anchor means, a first further anchor means spaced from said first lower anchor member in a direction away from said first inside wall surface and a second further anchor means spaced from said second lower anchor member in the direction away from said first inside wall surface;

wherein said first and second upper anchor means and said first and second lower anchor members are so arranged as to set said net member in said folded state in which said net member is folded for holding the luggage between said first and second half net areas of said net member, said first and third remote portions of said net member are held by said first upper anchor means, said second and fourth remote portions of said net member are held by said second upper anchor means, said first side portion of said net member is held by said first lower anchor member and said second side portion of said net member is held by said second lower anchor member; and wherein said first and second further anchor means are so positioned as to set said net member in said L-shaped state in which said first half net area of said net member is spread over said first upright inside wall surface for holding the luggage between said first half net area and said upright wall, said second half net area of said net member is spread over said floor for holding the luggage between said second half net area and said floor, said first remote portion of said net member is held by said first upper anchor means, said second remote portion of said net member is held by said second upper anchor means, said first side portion of said net member is held by said first lower anchor member, said second side portion of said net member is held by said second lower anchor member, said third remote portion of said net member is held by said first further anchor means and said fourth remote portion of said net member is held by said second further anchor means.

13. A vehicle body structure according to claim 12, wherein said compartment structure comprises a panel structure and an interior trimming means; said first upper anchor means comprises a first upper anchor member; said second upper anchor means comprises a second upper anchor member; and each of said anchor members comprises a net holding portion for holding said net member and a base portion for fixing said net holding portion to said panel structure, and fastening said trimming means to said panel structure.

14. A vehicle body structure according to claim 12, wherein said further anchor means of said net holding means comprises a first intermediate anchor member and a first distant anchor member which is more distant from said first upright inside wall surface than said first intermediate anchor member; said second further anchor means comprises a second intermediate anchor member and a second distant anchor member which is more distant from said first upright inside wall surface than said second intermediate anchor member; said first and second intermediate anchor members and said first and second lower anchor members are so arranged as to set said net member in said L-shaped state in which said third remote portion of said net member is held by said first intermediate anchor member and said fourth remote portion of said net member is held by said second intermediate anchor member; and said first and second distant anchor members are so positioned as to set said net member in a fully spread state in which said first and second remote portions of said net member are held, respectively, by said first and second lower anchor members, and said third and fourth remote portion of said net member are held, respectively by said first and second distant anchor members.

15. A vehicle body structure according to claim 14, wherein said compartment structure comprises a panel structure and an interior trimming means; said first upper anchor means comprises a first upper anchor member; said second upper anchor means comprises a second upper anchor member; and each of said anchor members comprises a net holding portion for holding said net member and a base portion for fixing said net holding portion to said panel structure, and simultaneously fastening said trimming means to said panel structure.

16. A vehicle body structure according to claim 15, wherein said compartment structure is formed with a plurality of attachment holes each of which extends from an inner hole end opening in said trimming means and an outer hole end opening in said panel structure; each of said anchor members comprises a holder comprising said net holding portion for catching said net member; a grommet having a head supporting said holder in said compartment and abutting on said trimming means, an insert projection which projects from said head through one of said attachment hole to a projection end, and a center hole extending from a first hole end opening in said head and a second hole end opening in said projection end; and a pin comprising a head located inside said compartment and in insert projection which projects from said head of said pin through said center hole of said grommet and which comprises a tapered section for expanding said projection end of said grommet to prevent said projection end of said grommet from being extracted from the attachment hole when said pin is deeply inserted into said grommet and for allowing said projection end of said grommet to shrink and to pass through the attachment hole when said pin is pulled.

17. A vehicle body structure according to claim 16, wherein each of said anchor members comprises a weakened portion for normally fastening said net member to said panel structure and for releasing said net member from said panel structure to protect said panel structure from being deformed when an excessive pulling force is applied from said net member.

18. A vehicle body structure according to claim 17, wherein said holder of each of said anchor members is swingably mounted on the grommet, and comprises said weakened portion which comprises first and second reduced end portions, and said net holding portion extending from said first reduced end portion which is rotatably supported by the grommet and which is reduced in sectional size than said net holding portion, to said second reduced end portion which is rotatably supported by the grommet, and which is reduced in sectional size than said net holding portion.

19. A vehicle body structure according to claim 16, wherein said net holding means further comprises a first higher anchor member located above said first intermediate anchor member, and a second higher anchor member located above said second intermediate anchor member, said first and second higher anchor members and said first and second intermediate anchor members are so arranged as to set said net member in a vertical state in which said first and second remote portions of said net member are held, respectively, by said first and second higher anchor members, and said third and fourth remote portions of said net member are held, respectively, by said first and second intermediate anchor members.

20. A vehicle body structure according to claim 19, wherein said net member comprises an elastic means comprising a first elastic cord segment extending between said first and second remote portions of said net member, a second elastic cord segment extending between said third and fourth remote portions of said net member, and an intermediate elastic cord segment extending between said first and second side portions of said net member and separating said first and second half net areas of said net member.

21. A vehicle body structure according to claim 19, wherein said net member comprises first and second corner catch members attached, respectively, to said first and second remote portions of said net member, third and fourth corner catch members attached, respectively, to said third and fourth remote portions of said net member, first and second side catch members attached, respectively, to said first and second side portions of said net member, and first and second extension catch members attached to first and second end of said second cord segment, which extends beyond said third remote portion of said net member to said first end of said second cord segment, and which extends beyond said fourth remote portion of said net member to said second end of said second cord segment.

22. A vehicle body structure according to claim 19, wherein said upright wall of said compartment structure comprises a second inside upright wall surface confronting said first inside upright wall surface, and first and second side wall surfaces confronting each other between said first and second inside upright wall surfaces; and wherein said first and second upper anchor means, said first and second lower anchor member and said first and second further anchor means are all attached to said upright wall.

23. A vehicle body structure according to claim 22, wherein said panel structure of said compartment structure comprises a floor panel defining the floor of said compartment, first and second upright panels confronting each other and defining, respectively, said first and second inside upright side wall surfaces, and first and second side panels confronting each other between said first and second upright panels, and defining, respectively, said first and second side wall surfaces; and wherein said first and second upper anchor means and said first and second lower anchor members are attached to said first upright panel, said first and second intermediate anchor members are attached, respectively, to said first and second side panels, and said first and second distant anchor members are attached to said second upright panel.

24. A vehicle body structure according to claim 23, wherein said compartment is a luggage compartment formed in a rear part of the vehicle body; said first upright panel faces toward a front of the vehicle body; said second upright panel is placed between a passenger compartment of the vehicle body and said luggage compartment; said panel structure of said compartment structure further comprises a parcel panel extending above said floor panel from said an upper end of said second upright panel toward said first upright panel; and said first and second higher anchor members are attached to said parcel panel.

25. A vehicle body structure according to claim 2 each of said first and second upper anchor means holds at least two of said first, second, third and fourth remote portions of the net members.

26. A trunk net structure for a vehicle, comprising:
a trunk compartment comprising a floor panel and an upright wall;
a net member comprising a first net area spanning over said floor panel to hold luggage on said floor panel, and a second net area spanning over the upright panel to hold luggage between said second net area and an upright panel, said first net area and said second net area creating an essentially L-shaped configuration; and
a first set of net holding anchor members for holding said first area of said net member on the floor panel, at least one of said first set of net holding anchor members being distributed on the floor panel; and a second set of net holding anchor members for holding the second area of said net member on the upright wall, at least one of said second set of net holding anchor members being distributed on the upright wall, said second set of net holding anchor members fixing an interior trim member in position on the upright wall of the trunk compartment.

* * * * *